United States Patent
Milewski et al.

(10) Patent No.: US 12,065,077 B2
(45) Date of Patent: Aug. 20, 2024

(54) METHODS AND SYSTEMS FOR POSITIONING VEHICLE MIRRORS

(71) Applicant: GM GLOBAL TECHNOLOGY OPERATIONS LLC, Detroit, MI (US)

(72) Inventors: Daniel Milewski, Brighton, MI (US); Robert James Meyer, Highland, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 273 days.

(21) Appl. No.: 17/660,707

(22) Filed: Apr. 26, 2022

(65) Prior Publication Data

US 2023/0339396 A1 Oct. 26, 2023

(51) Int. Cl.
*B60R 1/00* (2022.01)
*B60R 1/02* (2006.01)
*B60R 1/07* (2006.01)
*B60R 16/037* (2006.01)

(52) U.S. Cl.
CPC .............. *B60R 1/006* (2013.01); *B60R 1/07* (2013.01); *B60R 16/037* (2013.01); *B60R 1/025* (2013.01); *B60W 2520/16* (2013.01)

(58) Field of Classification Search
CPC ......... B60R 1/006; B60R 1/07; B60R 16/037; B60R 1/025; B60W 2520/16
See application file for complete search history.

(56) References Cited

U.S. PATENT DOCUMENTS

| | | | | |
|---|---|---|---|---|
| 4,698,571 A | * | 10/1987 | Mizuta | B60N 2/0248 318/568.1 |
| 5,668,675 A | * | 9/1997 | Fredricks | B60R 21/01552 359/872 |
| 6,684,140 B2 | * | 1/2004 | Lu | B60G 17/016 701/45 |
| 2007/0263301 A1 | * | 11/2007 | Agrest | B60R 1/025 359/843 |
| 2013/0342926 A1 | * | 12/2013 | Lutz | B60R 1/025 359/846 |
| 2023/0095614 A1 | * | 3/2023 | Otsuka | B60R 1/04 701/49 |

* cited by examiner

*Primary Examiner* — Peter D Nolan
*Assistant Examiner* — Tanya C Sienko
(74) *Attorney, Agent, or Firm* — Lorenz & Kopf LLP

(57) ABSTRACT

Methods and systems are provided for providing guidance when reversing a vehicle towing a trailer. In one embodiment, a method includes: determining, by the processor, a change in vehicle pitch angle based on stored vehicle pitch angle data and current pitch angle data; when the change in vehicle pitch angle is greater than a threshold, determining, by the processor, new mirror position data based on stored mirror position data, the stored vehicle pitch angle data, and the current pitch angle data; and generating, by the processor, control signals to control a position of the mirror based on the new mirror position data.

11 Claims, 3 Drawing Sheets

METHODS AND SYSTEMS FOR POSITIONING VEHICLE MIRRORS

INTRODUCTION

The technical field generally relates to vehicles and, more specifically, to methods and systems for controlling the position of mirrors of a vehicle.

Vehicles are typically equipped with one or more mirrors to assist a driver with viewing an environment surrounding the vehicle. For example, side view mirrors of a vehicle enable a driver to view the environment to the left and right side of the vehicle and partially behind the vehicle. The driver adjusts a position of the side view mirrors relative to their position in the vehicle to provide an ideal field of view.

Typically, when loading a vehicle up with cargo or a trailer, the rear of the vehicle will squat. When the squat is significant, the driver needs to manually readjust the mirrors to maintain the desired field of view. Manually adjusting the mirrors can be time consuming and annoying.

Accordingly, it is desirable to provide methods and systems for automatically adjusting the side view mirrors when a load is detected. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for controlling a position of a mirror of a vehicle. In one embodiment, a method includes: determining, by the processor, a change in vehicle pitch angle based on stored vehicle pitch angle data and current pitch angle data; when the change in vehicle pitch angle is greater than a threshold, determining, by the processor, new mirror position data based on stored mirror position data, the stored vehicle pitch angle data, and the current pitch angle data; and generating, by the processor, control signals to control a position of the mirror based on the new mirror position data.

In various embodiments, the method includes storing, in a data storage device, parameters associated with the stored mirror position data and the stored vehicle pitch angle data.

In various embodiments, the storing is performed in response to user input indicating to store a mirror position in memory.

In various embodiments, the current pitch angle data is determined based on inertial measurement unit data.

In various embodiments, the current pitch angle data is determined based on suspension system displacement data.

In various embodiments, the stored mirror position data includes a vehicle relative mirror angle.

In various embodiments, the stored vehicle pitch angle data includes an earth relative pitch angle.

In various embodiments, the new mirror position data is determined based on a relationship: $\theta_{ml} = \theta_{mm} - \theta_{vm} + \theta_{vl}$, where $\theta_{mm}$ represents the vehicle relative mirror angle setting saved in the datastore, $\theta_{vm}$ represents the earth relative to vehicle pitch angle, and $\theta_{vl}$ represents the earth relative pitch angle when the change in vehicle pitch angle indicates there is loading.

In another embodiment, a system for controlling a position of a mirror of a vehicle, includes a non-transitory computer readable medium configured to store mirror position data associated with the mirror; and a computer system onboard the vehicle. The computer system is configured to, by a processor: determine a change in vehicle pitch angle based on stored vehicle pitch angle data and current pitch angle data; when the change in vehicle pitch angle is greater than a threshold, determine new mirror position data based on the stored mirror position data, the stored vehicle pitch angle data, and the current pitch angle data; and generate control signals to control a position of the mirror based on the new mirror position data.

In various embodiments, the computer system is configured to, by the processor, store in the non-transitory computer readable medium, with the stored mirror position data and the stored vehicle pitch angle data.

In various embodiments, the computer system is configured to, by the processor, store in the non-transitory computer readable medium, in response to user input indicating to store a mirror position in memory.

In various embodiments, the current pitch angle data is determined based on inertial measurement unit data.

In various embodiments, the current pitch angle data is determined based on suspension system displacement data.

In various embodiments, the stored mirror position data includes a vehicle relative mirror angle.

In various embodiments, the stored vehicle pitch angle data includes an earth relative pitch angle.

In various embodiments, the new mirror position data is determined based on a relationship: $\theta_{ml} = \theta_{mm} - \theta_{vm} + \theta_{vl}$, where $\theta_{mm}$ represents the vehicle relative mirror angle, $\theta_{vm}$ represents the earth relative to vehicle pitch angle, and $\theta_{vl}$ represents the earth relative pitch angle when the change in vehicle pitch angle indicates there is loading.

In another embodiment, a vehicle includes: at least one side view mirror; a power mirror positioning system configured to control a position of the at least one side view mirror; and a computer system. The computer system is configured to, by a processor: determine a change in vehicle pitch angle based on stored vehicle pitch angle data and current pitch angle data; when the change in vehicle pitch angle is greater than a threshold, determine new mirror position data based on stored mirror position data, the stored vehicle pitch angle data, and the current pitch angle data; and generate control signals to the power mirror positioning system to control a position of the at least one side view mirror based on the new mirror position data.

In various embodiments, the stored mirror position data includes a vehicle relative mirror angle.

In various embodiments, the stored vehicle pitch angle data includes an earth relative pitch angle.

In various embodiments, the new mirror position data is determined based on a relationship: $\theta_{ml} = \theta_{mm} - \theta_{vm} + \theta_{vl}$, where $\theta_{vl}$ represents the vehicle relative mirror angle, $\theta_{vm}$ represents the earth relative to vehicle pitch angle, and $\theta_{vl}$ represents the earth relative pitch angle when the change in vehicle pitch angle indicates there is loading.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
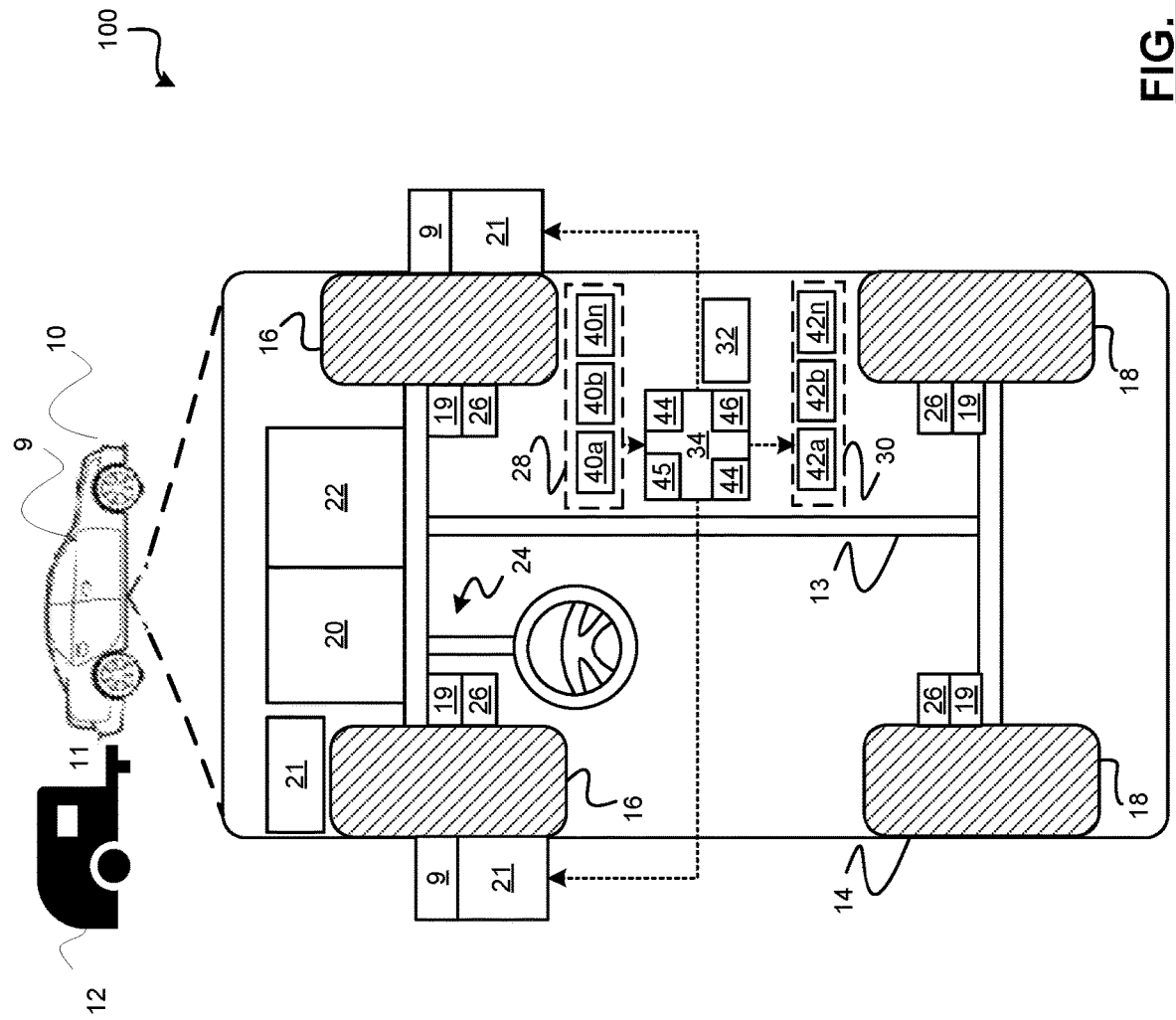
FIG. 1 is a functional block diagram of a vehicle that includes a mirror system for, in accordance with various embodiments.

With reference to FIG. 1, a mirror system shown generally at 100 is associated with a vehicle 10 in accordance with various embodiments. In various embodiments, the vehicle 10 comprises an automobile having one or more side view mirrors 9. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms and is not limited to an automobile.

In various embodiments, the vehicle 10 is associated with a trailer 12 capable of hauling a load. As can be appreciated, the trailer 12 may any type of towable application having one or more wheels and is not limited to any one embodiment. The vehicle 10 is configured to couple to and connect to the trailer 12 via a connection apparatus 11 and is configured to tow the trailer 12. In various embodiments, the connection apparatus 11 comprises a hitch. In various other embodiments, the connection apparatus 11 comprises one or more other types of systems, such as a gooseneck for a fifth wheel trailer, and so on. In various embodiments, the connection apparatus 11 further comprises a wiring harness configured to communicate power and/or communication signals to and from components of the trailer 12. As depicted in FIG. 1, the exemplary vehicle 10 generally includes a chassis 13, a body 14, front wheels 16, rear wheels 18, a suspension system 19, and two or more side view mirrors 9. The body 14 is arranged on the chassis 13 and substantially encloses components of the vehicle 10. The body 14 and the chassis 13 may jointly form a frame. The wheels 16-18 are each rotationally coupled to the chassis 13 through the suspension system 19 near a respective corner of the body 14. The side view mirrors 9 couple to the body 14 at or near a door associated with a driver side of the vehicle 10 and at or near a door associated with a passenger side of the vehicle 10. A position of the side view mirrors 9 is adjustable by way of a power mirror positioning system 21 configured to adjust the position and/or angle of the mirror 9 relative to the vehicle 10.

The vehicle 10 further includes a propulsion system 20, a transmission system 22, a steering system 24, a brake system 26, a sensor system 28, an actuator system 30, at least one data storage device 32, at least one controller 34, and a display system 35. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle and/or of the vehicle itself. The sensing devices 40a-40n can include, but are not limited to, radars, lidars, global positioning systems, optical cameras, thermal cameras, ultrasonic sensors, inertial measurement units, pressure sensors, position sensors, displacement sensors, speed sensors, and/or other sensors. In various embodiments, the sensor system 28 includes a camera 40a configured to sense an environment at or near a rear portion of the vehicle 10 and to generate image data based thereon, a suspension displacement sensor 40b that senses a displacement of the suspension system 19 at the front of the vehicle 10 and/or at the rear of the vehicle 10 and generates suspension data based thereon, and/or an inertial measurement unit (IMU) 40c that measures an orientation of the vehicle 10 and generates IMU data based thereon.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). In various embodiments, the vehicle features include the power mirror positioning system 21.

The data storage device 32 stores data for use in controlling the vehicle 10. In various embodiments, the data storage device 32 stores defined values for controlling the vehicle. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the mirror system 100 and, when executed by the processor 44, receive data from the sensor system 28 and process the data in order to generate control data for controlling a position of one or more of the side view mirrors 9. For example, the instructions process data from suspension displacement sensors 40b and/or the IMU sensor 40c to read the vehicle's current pitch angle when the mirror position is set to memory and then uses the same sensors to measure any change to the vehicle pitch thereafter, and adjusts a position of the side view mirrors 9 accordingly. This allows the side view mirrors 9 to automatically and properly adjust regardless of a vehicle loading condition.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
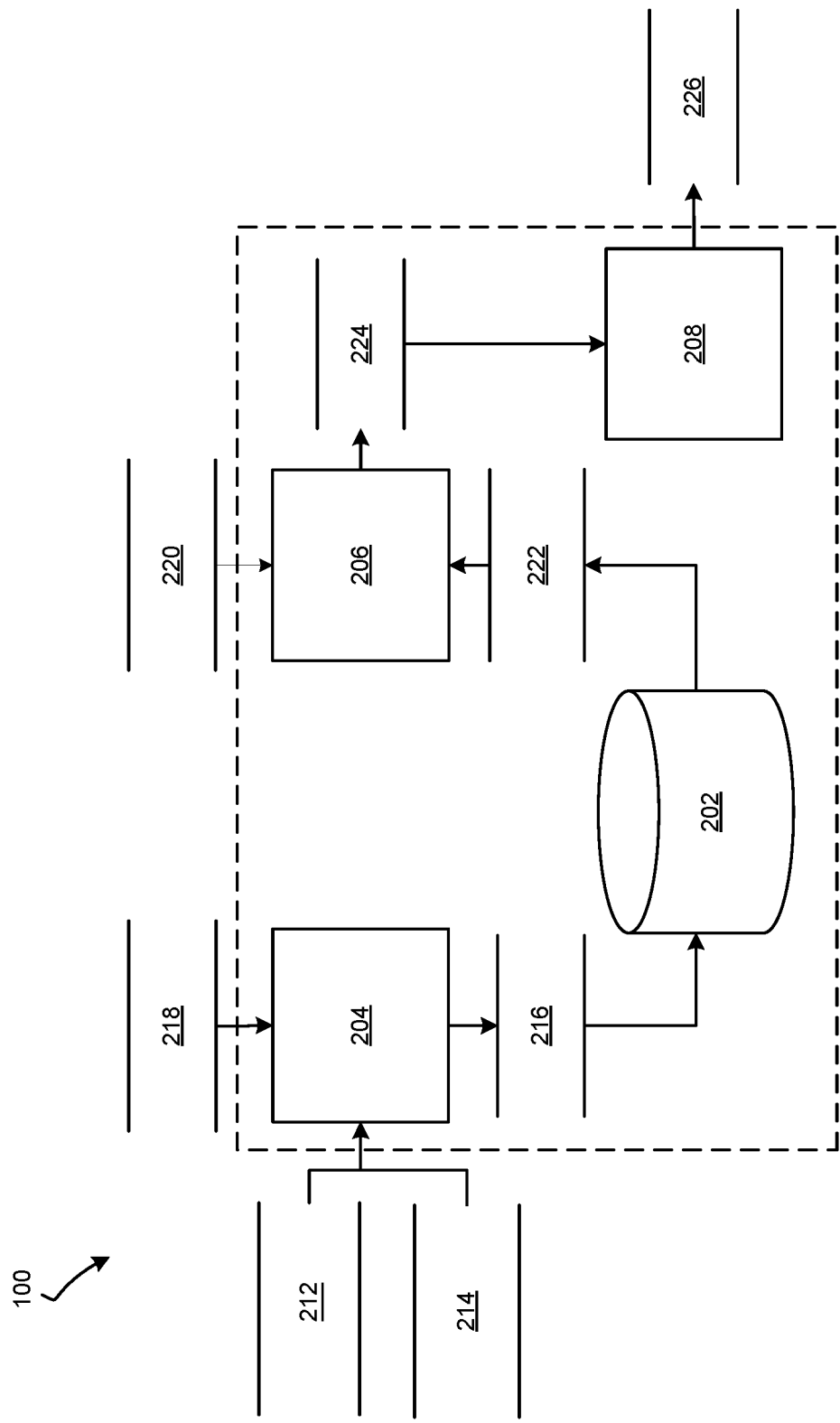
FIG. 2 is a dataflow diagram illustrating elements of the mirror system of the vehicle of FIG. 1, in accordance with various embodiments.

With reference to FIG. 2 and with continued reference to FIG. 1, a dataflow diagram illustrates elements of the mirror system 100 of FIG. 1 in accordance with various embodiments. As can be appreciated, various embodiments of the mirror system 100 according to the present disclosure may include any number of modules embedded within the controller 34 which may be combined and/or further partitioned to similarly implement systems and methods described herein. Furthermore, inputs to the mirror system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the mirror system 100 includes a parameter data datastore 202, a parameter determination module 204, a mirror position determination module 206, and a mirror position control module 208.

In various embodiments, the parameter determination module 204 receives as input vehicle pitch angle data 212, and mirror position data 214. In various embodiments, the vehicle pitch angle data 212 indicates a pitch angle of the vehicle 10 relative to the ground the vehicle 10 is traveling. As can be appreciated, the pitch angle can be determined based on displacement data associated with the suspension system and/or based on IMU data. In various embodiments, the mirror position data 214 indicates a position of the side view mirror 9 relative to the vehicle 10. As can be appreciated, the mirror position angle can be determined from previous mirror control signals and/or position sensor data.

The parameter determination module 204 associates the vehicle pitch angle with the mirror position. Thereafter, the parameter determination module 204 stores the associated data as parameter data 216 in the parameter data datastore 202. For example, when user data 218 is received indicating to store a current mirror position in memory as a default position, the parameter determination module 204 associates and stores the data in the parameter data datastore 202.

In various embodiments, the mirror position determination module 206 receives as input current vehicle pitch angle data 220. The mirror position determination module 206 then retrieves the default parameter data 222 from the parameter data datastore 202 and determines new mirror angle data 224 based thereon. For example, when a change in the vehicle pitch angle is greater than a threshold (e.g., sufficient to cause a difference in the field of view from the mirror), the mirror position determination module 206 determines the new mirror angle $\theta_{ml}$ based on the relationship:

$$\theta_{ml} = \theta_{mm} - \theta_{vm} + \theta_{vl},$$

where $\theta_{mm}$ represents the vehicle relative mirror angle setting saved in the datastore, $\theta_{vm}$ represents the earth relative to vehicle pitch angle setting saved in the datastore, and $\theta_{vl}$ represents the earth relative pitch angle when the vehicle pitch has been affected by loading.

In various embodiments, the mirror position control module 208 receives as input the mirror angle data 224. The mirror position control module 208 generates control data 226 that controls the power mirror positioning system 21 such that the desired position of the side view mirror 9 is achieved, thereby enabling an improved view behind the vehicle 10 when the vehicle 10 is subject to a load.

Figure 4:
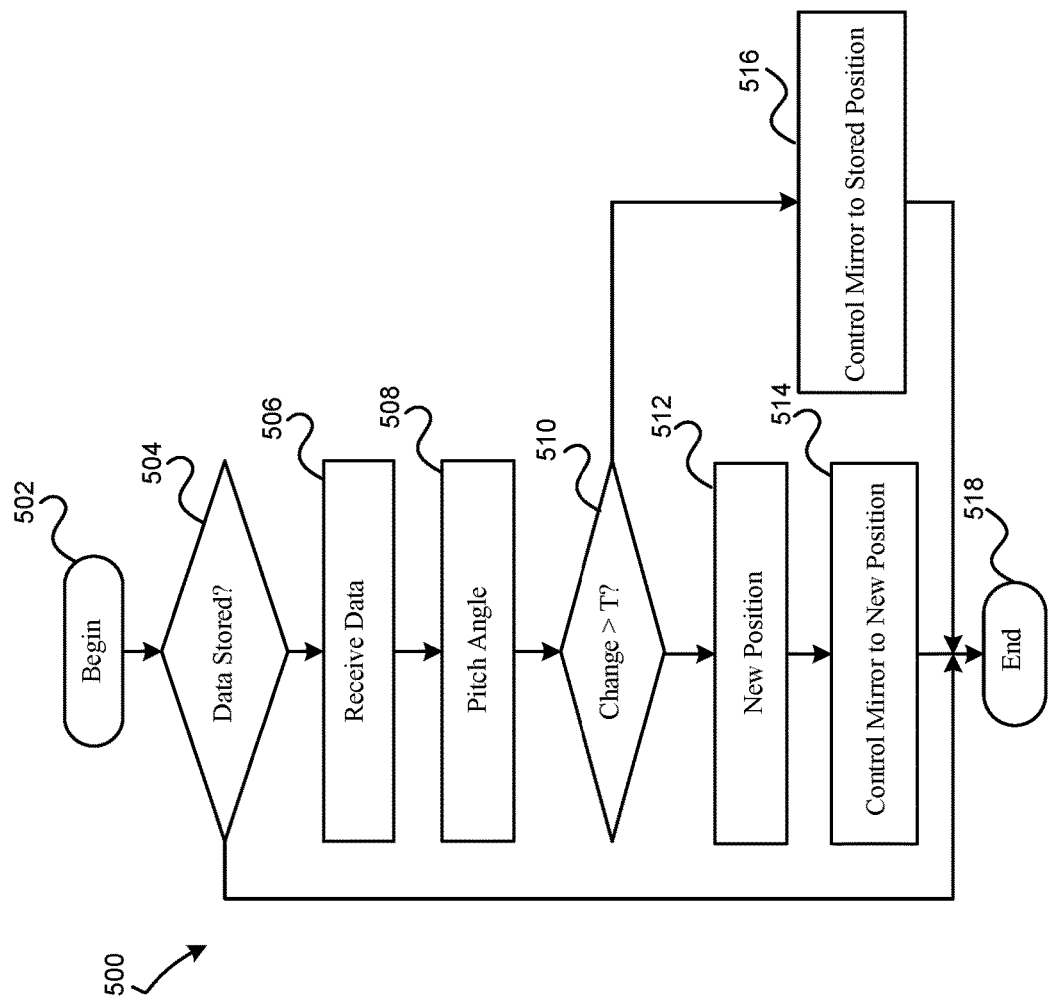
FIGS. 3 and 4 are flowcharts of a process for positioning a mirror of the vehicle as performed by the mirror system of the vehicle of FIGS. 1 and 2, in accordance with exemplary embodiments.
Figure 3:
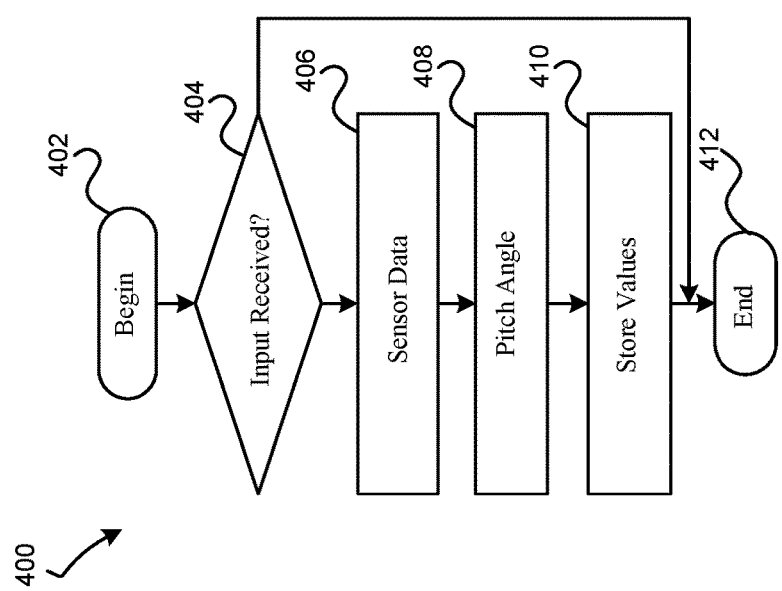

With reference now to FIGS. 3 and 4 and with continued reference to FIGS. 1-2, flowcharts provided of methods 400, 500 for controlling a position of a side view mirror a vehicle 10 associated with a load as performed by the mirror system 100, in accordance with exemplary embodiments. As can be appreciated in light of the disclosure, the order of operation within the methods 400, 500 is not limited to the sequential execution as illustrated in FIGS. 3 and 4, but may be performed in one or more varying orders as applicable and in accordance with the present disclosure. In various embodiments, the methods 400, 500 can be scheduled to run based on one or more predetermined events, and/or can run continuously during operation of the vehicle 10.

In one example, the method 400 may begin at 402. Once user input is received indicating to store the configured position of the side view mirror 9 at 404, sensor data is received at 406. The vehicle pitch angle is determined from the sensor data at 408. The vehicle pitch angle along with the current mirror position are stored in the parameter data datastore 202 at 410. Thereafter, the method may end at 412.

In another example, the method 500 may begin at 502. Once the parameter data 216 has been stored (at 504) by, for example, the method 400, sensor data is received at 506. The vehicle pitch angle is computed from the sensor data at 508. A change in pitch angle between the stored vehicle pitch angle and the computed pitch angle is computed and compared to a threshold at 510. When the change in pitch angle is not greater than the threshold at 510, control signals are generated to the side view mirror system to control the position of the side view mirror to the stored mirror position (at 516). Thereafter, the method may end at 518.

When the change in pitch angle is greater than the threshold at 510, a new mirror position is determined, for example, as discussed above at 512 and control signals are generated to the power mirror positioning system 21 to control the position of the side view mirror 9 to the new mirror position (at 514). Thereafter, the method may end at 518.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for controlling a position of a mirror of a vehicle, comprising:
   determining, by a processor, a change in vehicle pitch angle based on stored vehicle pitch angle data and current pitch angle data;
   when the change in vehicle pitch angle is greater than a threshold, determining, by the processor, new mirror position data based on stored mirror position data, the stored vehicle pitch angle data, and the current pitch angle data; and
   generating, by the processor, control signals to control a position of the mirror based on the new mirror position data; wherein:
   the stored mirror position data includes a vehicle relative mirror angle;
   the stored vehicle pitch angle data includes an earth relative pitch angle; and
   the new mirror position data is determined based on a relationship: $\theta_{ml} = \theta_{mm} - \theta_{vm} + \theta_{vl}$, where $\theta_{mm}$ represents the vehicle relative mirror angle saved in a datastore, $\theta_{vm}$ represents the earth relative pitch angle, and $\theta_{vl}$ represents the earth relative pitch angle when the change in vehicle pitch angle indicates there is loading.

2. The method of claim 1, further comprising storing, in a data storage device, parameters associated with the stored mirror position data and the stored vehicle pitch angle data.

3. The method of claim 2, wherein the storing is performed in response to user input indicating to store a mirror position in memory.

4. The method of claim 1, wherein the current pitch angle data is determined based on inertial measurement unit data.

5. The method of claim 1, wherein the current pitch angle data is determined based on suspension system displacement data.

6. A system for controlling a position of a mirror of a vehicle, comprising:
   a non-transitory computer readable medium configured to store mirror position data associated with the mirror; and
   a computer system onboard the vehicle and configured to, by a processor:

determine a change in vehicle pitch angle based on stored vehicle pitch angle data and current pitch angle data;

when the change in vehicle pitch angle is greater than a threshold, determine new mirror position data based on the stored mirror position data, the stored vehicle pitch angle data, and the current pitch angle data; and generate control signals to control a position of the mirror based on the new mirror position data; wherein:

the stored mirror position data includes a vehicle relative mirror angle;

the stored vehicle pitch angle data includes an earth relative pitch angle; and the new mirror position data is determined based on a relationship: $\theta_{ml} = \theta_{mm} - \theta_{vm} + \theta_{vl}$, where $\theta_{mm}$ represents the vehicle relative mirror angle, $\theta_{vm}$ represents the earth relative pitch angle, and $\theta_{vl}$ represents the earth relative pitch angle when the change in vehicle pitch angle indicates there is loading.

7. The system of claim 6, wherein the computer system is configured to, by the processor, store in the non-transitory computer readable medium, parameters associated with the stored mirror position data and the stored vehicle pitch angle data.

8. The system of claim 7, wherein the computer system is configured to, by the processor, store in the non-transitory computer readable medium, in response to user input indicating to store a mirror position in memory.

9. The system of claim 6, wherein the current pitch angle data is determined based on inertial measurement unit data.

10. The system of claim 6, wherein the current pitch angle data is determined based on suspension system displacement data.

11. A vehicle, comprising at least one side view mirror;

a power mirror positioning system configured to control a position of the at least one side view mirror; and a computer system configured to, by a processor:

determine a change in vehicle pitch angle based on stored vehicle pitch angle data and current pitch angle data;

when the change in vehicle pitch angle is greater than a threshold, determine new mirror position data based on stored mirror position data, the stored vehicle pitch angle data, and the current pitch angle data; and generate control signals to the power mirror positioning system to control a position of the at least one side view mirror based on the new mirror position data; wherein:

the stored mirror position data includes a vehicle relative mirror angle;

the stored vehicle pitch angle data includes an earth relative pitch angle; and the new mirror position data is determined based on a relationship: $\theta_{ml} = \theta{mm} - \theta_{vm} + \theta_{vl}$, where $\theta_{mm}$ represents the vehicle relative mirror angle saved in a datastore, $\theta_{vm}$ represents the earth relative pitch angle, and $\theta_{vl}$ represents the earth relative pitch angle when the change in vehicle pitch angle indicates there is loading.

* * * * *